Feb. 26, 1929.

R. N. KIRCHER 1,703,196

VALVE FOR COOKERS

Filed Nov. 18, 1925

Inventor:
Ralph N. Kircher.
By Sprinkle & Smith
Attys.

Patented Feb. 26, 1929.

1,703,196

UNITED STATES PATENT OFFICE.

RALPH N. KIRCHER, OF WEST BEND, WISCONSIN, ASSIGNOR TO WEST BEND ALUMINUM COMPANY, A CORPORATION OF WISCONSIN.

VALVE FOR COOKERS.

Application filed November 18, 1925. Serial No. 69,829.

This invention relates to a valve for a cooker and more particularly to a cooker of the steam tight type or better known as waterless cookers.

One of the objects of the present invention is to provide an improved form of valve mechanism which economizes in the fuel and maintains the heat in the cooker at a predetermined temperature.

A further object of the invention is to provide an improved construction and arrangement of a valve for a cooker which permits the limited escape of steam and always maintains the heat at the minimum, but predetermined temperature, which is an ideal cooking temperature.

A still further object of the invention is to provide a valve construction for a cooking vessel which will indicate by the number of pops per minute when the heat within the vessel has reached the ideal cooking temperature.

These and other objects are accomplished by providing a construction and an arrangement of the various parts in the manner hereinafter described and particularly pointed out in the appended claims.

Figure 1:
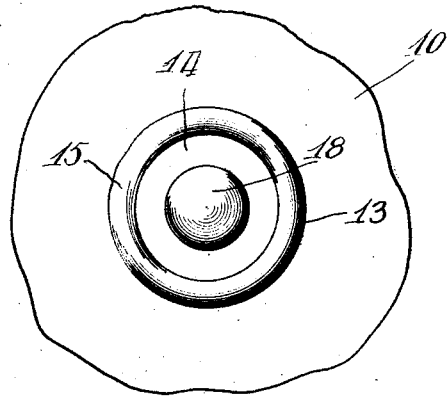

Referring to the drawings, Fig. 1 is a fragmentary top plan view of a cover for a vessel showing my improved valve mechanism mounted therein.

Figure 2:
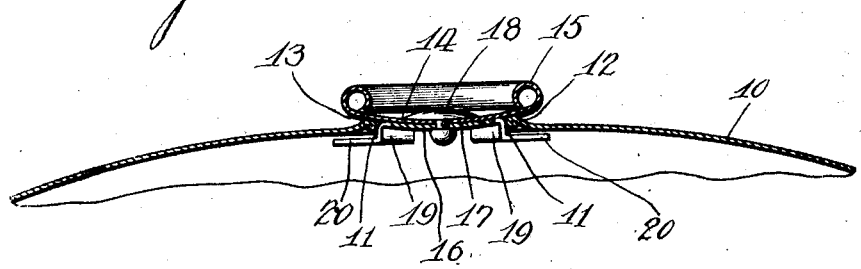
Figure 3:
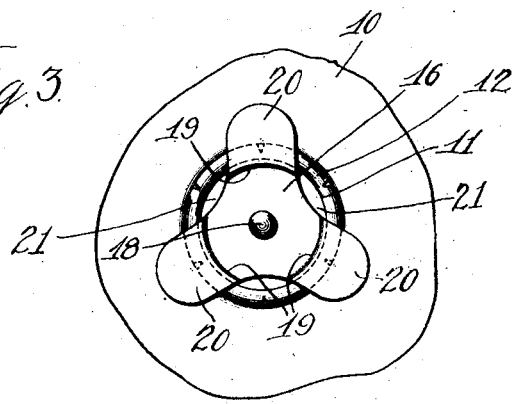

Fig. 2 is a cross sectional view taken on the plane passing through the vertical center of the valve and cover shown in Fig. 1, and Fig. 3 is a bottom plan view of the cover showing the construction of the lower side of the valve which permits a limited amount of steam to escape for maintaining the heat within the cooker at a predetermined temperature.

One of the novel features and novel results accomplished by my improved valve construction is the maintaining of the heat within the cooking vessel at a minimum low temperature of about two hundred and thirteen degrees Fahrenheit, which I have found to be the ideal cooking temperature. This not only produces exceptional results in cooking various foods but also economizes in the amount of fuel consumed in preparing the food.

In carrying out my invention I have shown the same in connection with a detachable cover 10 of the construction shown in my co-pending application Serial No. 66,905, filed November 5, 1925. The cover shown in this co-pending application is of the detachable steam tight type. Mounted centrally of the cover 10 in an aperture 11 formed by bending the material adjacent the aperture is an annular bead as shown at 12. The bead 12 is slightly raised upwardly from the curved surface of the top of the cover as shown in the cross sectional view in Fig. 2 and forms a seat for the closure member or valve 13. The closure member 13 has an inverted dome-like bottom 14 which is adapted to normally rest on the annular bead or seat 12 of the cover so as to form a steam tight fit between these two parts. The closure member or valve 13 is reinforced and strengthened by having the outer or peripheral material of the member coiled in the form of an annular bead as shown at 15.

One of the important features of my valve construction for a cooker comprises the provision of means whereby the escape of steam from the boiler is limited on each occasion that the valve is opened by the pressure within the boiler so that the heat within the boiler is always maintained at a minimum temperature, always slightly above boiling point, which I have found to be the ideal cooking temperature. This particular means comprises a three-winged member 16 which has its upper center portion as shown at 17 conforming to the inverted dome shape of the closure member 13, and secured thereto by a rivet 18. The three laterally projecting wings are spaced about the circle at about approximately one hundred and twenty degrees apart and have their intermediate portions offset as shown at 19, and have their outer or free ends extending horizontally outwardly as shown at 20 in a plane substantially parallel with the under surface of the cover. The offset 19 formed in each of the wings of the member 16 is arranged so that the valve may move vertically within the aperture 11 of the cover. The member 16 has a portion of the material between the wings 20 cut away so as to form relatively small openings at 21 for the escape of a limited amount of steam for maintaining the heat within the cooker at a minimum temperature.

From the above it will be noted that the winged members 16 in addition to retaining the closure member 13 in the aperture 11 of the cover 10 cover substantially the whole aperture 11 when the closure member or valve 13 is lifted from its seat except for the relatively small apertures 21, thereby limiting the amount of steam escaping from the cooker when the valve is raised.

In the actual use of the cooker with my improved valve mechanism the cooker is placed on the stove and the heat turned to a high point after the food has been placed in the cooker and the detachable cover securely fastened in position, and when the valve begins to pop indicating that the temperature is above boiling point, the heat is then adjusted or turned down so that the valve will release automatically once in approximately every five seconds. When this is done the heat will be always maintained at a minimum temperature or about two hundred and thirteen degrees Fahrenheit, which I have found to be the ideal cooking temperature. This temperature will be continuously maintained by reason of the construction of the member 16 which limits the amount of steam escaping from the cooker when the valve 13 is raised from its seat.

While in the above specification I have described one embodiment which my invention may assume in practice, it will, of course, be understood that the same is capable of modification and that modification may be made without departing from the spirit and scope of my invention as expressed in the following claims.

What I claim as my invention and desire to secure by Letters Patent is:

1. In combination with a cover for a boiler having an aperture therethrough, of a valve seat surrounding said aperture, a closure member having an inverted dome-like bottom mounted on said seat, and a member having its central portion conforming to the bottom of and secured to said closure member, said second named member having laterally extending wings offset with respect to the body portion of said member, and having cut-away portions adjacent the aperture in said cover whereby a limited amount of steam may escape when said closure member is raised.

2. In a valve structure for cooking vessels, the combination of a valve seat comprising an annular bead surrounding an aperture, a closure member adapted to engage said seat, and a plurality of radially extending wings mounted on said member, said wings having offset portions extending through said aperture and having their free end portions adapted to extend outwardly beyond said aperture at the opposite side of said seat from said closure member in a manner to limit the movement of said member with respect to said seat 3. In a valve structure for cooking vessels, the combination of a valve seat surrounding an aperture, a closure member of concavo-convex form adapted to engage said seat, and a plurality of radially extending wings mounted on the convex side of said member, said wings having offset portions extending through said aperture in a manner to be guided therein and having their free end portions adapted to extend outwardly beyond said aperture at the opposite side of said seat from said closure member in a manner to limit the movement of said member with respect to said seat.

4. An article of manufacture comprising a concavo-convex disc-like closure member, and a second member having a portion adapted to conform to the convex surface of said closure member and to be secured adjacent thereto, said second member having a plurality of lateral projections formed integrally therewith and extending in a plane below the plane of said second member.

5. In a valve structure for cooking vessels, the combination of a valve seat surrounding an aperture, a closure member of concavo-convex form, the convex surface of which is adapted to engage said seat, and means extending from the convex surface of said closure member adapted to secure the closure member in the aperture and permit the said member to move toward and away from the valve seat, said means including spaced apart radial extensions spaced from the surface of the closure member and adapted to extend beyond the periphery of the aperture on the side of the aperture opposite the valve seat.

6. In a valve for cooking vessels, the combination of a valve seat comprising a raised bead formed on the vessel cover surrounding an aperture, a closure member adapted to engage said seat in a manner to close said aperture, means carried by said member and extending through said aperture in a manner to be guided therein and bent outwardly at the opposite side of said seat from said closure member to form a stop for limiting the movement of said member with respect to said valve seat, said means having portions thereof cut away to permit the escape of steam between said seat and closure member when the latter is raised from the valve seat.

7. In a valve structure, the combination with the cover for a cooking vessel having an aperture formed therein and a valve seat comprising a raised bead formed on said cover and surrounding said aperture, of a closure member adapted to engage said seat in a manner to close said aperture, means carried by said member and extending through said aperture in a manner to be guided therein and having its inner or lower end portion bent outwardly to extend beyond said aperture at the opposite side of said valve seat from said closure member and spaced from the inner face of said vessel cover in a manner to permit a limited movement of said closure member away from said valve seat, said means having portions thereof cut away to permit the escape of steam through the valve when said closure member is raised from said valve seat.

8. In a valve structure for cooking vessels, the combination of a valve seat surrounding an aperture, a closure member of convex form engaged in the seat, a second member arranged in the said opening and having a body portion conforming to the convexity of the closure member and secured thereto, the second member having a plurality of projections formed integrally therewith, and extending laterally with respect to the body portion at the under side of the valve seat.

In testimony whereof I have signed my name to this specification, on this 13th day of November, A. D. 1925.

RALPH N. KIRCHER.